US008379518B2

(12) United States Patent
Kataria et al.

(10) Patent No.: US 8,379,518 B2
(45) Date of Patent: Feb. 19, 2013

(54) MULTI-STAGE SCHEDULER WITH PROCESSOR RESOURCE AND BANDWIDTH RESOURCE ALLOCATION

(75) Inventors: Deepak Kataria, Bridgewater, NJ (US); Chengzhou Li, Whitehall, PA (US)

(73) Assignee: Agere Systems LLC, Allentown, PA (US)

( * ) Notice: Subject to any disclaimer, the term of this patent is extended or adjusted under 35 U.S.C. 154(b) by 948 days.

(21) Appl. No.: 11/625,884

(22) Filed: Jan. 23, 2007

(65) Prior Publication Data

US 2008/0175270 A1    Jul. 24, 2008

(51) Int. Cl.
*G01R 31/08* (2006.01)

(52) U.S. Cl. .................................................. 370/230

(58) Field of Classification Search ............ 370/230, 370/230.1, 395.4, 395.41, 395.42, 395.43
See application file for complete search history.

(56) References Cited

U.S. PATENT DOCUMENTS

| 6,449,255 | B1* | 9/2002 | Waclawsky | 370/236 |
| 6,697,328 | B1* | 2/2004 | Briem | 370/235 |
| 6,810,426 | B2* | 10/2004 | Mysore et al. | 709/234 |
| 6,909,691 | B1* | 6/2005 | Goyal et al. | 370/230 |
| 2005/0030896 | A1* | 2/2005 | Bahl et al. | 370/231 |
| 2005/0111461 | A1 | 5/2005 | Khan et al. | |
| 2005/0128951 | A1* | 6/2005 | Chawla et al. | 370/235 |
| 2005/0157728 | A1* | 7/2005 | Kawano et al. | 370/395.21 |
| 2006/0026192 | A1 | 2/2006 | Li et al. | |
| 2006/0117054 | A1 | 6/2006 | Li et al. | |
| 2007/0242675 | A1* | 10/2007 | Romrell et al. | 370/395.4 |
| 2011/0064084 | A1* | 3/2011 | Tatar et al. | 370/392 |

OTHER PUBLICATIONS

U.S. Appl. No. 11/468,917, filed Aug. 31, 2006, N.C. Kucuk et al., "Scheduling Methods and Appartus Based on Adjusted Channel Capacity."
U.S. Appl. No. 11/461,181, filed Jul. 31, 2006, Jinhui Li, "High-Throughput Scheduler with Integer-Based Eligible Number Initialization."
U.S. Appl. No. 11/427,476, filed Jun. 29, 2006, Jinhui Li, "Credit-Based Wireless Network Scheduling."
U.S. Appl. No. 11/415,831, filed May 1, 2006, C.W. Hamilton et al., "Wireless Network Scheduling Methods and Apparatus Based on Both Waiting Time and Occupancy."
U.S. Appl. No. 11/415,546, filed May 1, 2006, C.W. Hamilton et al., "High-Throughput Scheduler with Guaranteed Fairness for Wireless Networks and Other Applications."
A. Jalali et al., "Data Throughput of CDMA-HDR a High Efficiency-High Data Rate Personal Communication Wireless System," Proceedings of IEEE VTC 2000, pp. 1854-1858, May 2000.
S.S. Panwar et al., "Golden Ratio Scheduling for Flow Control with Low Buffer Requirements," IEEE Transactions on Communications, vol. 40, No. 4, pp. 765-772, Apr. 1992.
M. Andrews et al., "Providing Quality of Service Over a Shared Wireless Link," IEEE Communication Magazine, vol. 39, pp. 150-154, Feb. 2001.

* cited by examiner

*Primary Examiner* — Mark Rinehart
*Assistant Examiner* — Peter Cheng
(74) *Attorney, Agent, or Firm* — Ryan, Mason & Lewis, LLP

(57) ABSTRACT

A multi-stage scheduler that provides improved bandwidth utilization in the presence of processor intensive traffic is disclosed. Incoming traffic is separated into multiple traffic flows. Data blocks of the traffic flows are scheduled for access to a processor resource using a first scheduling algorithm, and processed by the processor resource as scheduled by the first scheduling algorithm. The processed data blocks of the traffic flows are scheduled for access to a bandwidth resource using a second scheduling algorithm, and provided to the bandwidth resource as scheduled by the second scheduling algorithm. The multi-stage scheduler in an illustrative embodiment may be implemented in a network processor integrated circuit or other processing device of a communication system.

22 Claims, 3 Drawing Sheets

MULTI-STAGE SCHEDULER WITH PROCESSOR RESOURCE AND BANDWIDTH RESOURCE ALLOCATION

FIELD OF THE INVENTION

The present invention relates generally to the field of telecommunications, and more particularly to schedulers used to control access to limited resources.

BACKGROUND OF THE INVENTION

In many telecommunications applications, a scheduler is used to resolve contention among multiple tasks competing for a limited resource. For example, such a scheduler is commonly used in a network processor to schedule multiple traffic flows for transmission over a specific transmission bandwidth.

A network processor generally controls the flow of data between a physical transmission medium, such as a physical layer portion of a network, and a switch fabric in a router or other type of switch. An important function of a network processor involves the scheduling of cells, packets or other data blocks, associated with the multiple traffic flows, for transmission to the switch fabric from the physical transmission medium of the network and vice versa. The network processor scheduler performs this function.

An efficient and flexible scheduler architecture capable of supporting multiple scheduling algorithms is disclosed in U.S. patent application Ser. No. 10/722,933, filed Nov. 26, 2003 in the name of inventors Asif Q. Khan et al. and entitled "Processor with Scheduler Architecture Supporting Multiple Distinct Scheduling Algorithms," which is commonly assigned herewith and incorporated by reference herein.

It is often desirable for a given scheduling algorithm implemented in a network processor or other processing device to be both simple and fair. Simplicity is important because the processing device hardware typically does not have a large amount of time to make a given scheduling decision, particularly in a high data rate environment. A good scheduler should also be fair. For example, it may allocate the bandwidth according to the weights of the users, with the higher-priority users getting more bandwidth than lower-priority users.

An example of a simple and fair scheduling algorithm is the Weighted Round-Robin (WRR) scheduling algorithm. Assume that in a given telecommunications application there is a number of users competing for one resource, where the resource can process one data block in each timeslot. The scheduler must decide which user can send one data block to the resource for processing in each timeslot. Each user has a weight to indicate its priority. The user with larger weight has higher priority. Under ideal conditions, the services received by the users should be proportional to their weights. A WRR scheduler serves the users in proportion to their weights in a round-robin fashion.

A modified version of the WRR scheduling algorithm is known as Deficit Round-Robin (DRR). In DRR scheduling, the users have respective deficit counters, and a particular user is served on a given pass of the scheduler only if its corresponding deficit counter is greater than or equal to the size of the data block to be transmitted by that user. If the deficit counter for the user is lower than the size of the data block to be transmitted, the user is skipped on the given pass but its deficit counter is increased by a designated amount referred to as a quantum. Also, the deficit counters of users transmitting data blocks on the given pass are decreased by the size of their respective transmitted data blocks.

Various drawbacks of WRR, DRR and other conventional scheduling algorithms are addressed by the techniques disclosed in U.S. patent application Ser. No. 10/903,954, filed Jul. 30, 2004 and entitled "Frame Mapping Scheduler," Ser. No. 10/998,686, filed Nov. 29, 2004 and entitled "Frame Mapping Scheduler with Compressed Mapping Table," Ser. No. 11/415,831, filed May 1, 2006 and entitled "Wireless Network Scheduling Methods and Apparatus Based on Both Waiting Time and Occupancy," Ser. No. 11/415,546, filed May 1, 2006 and entitled "High-Throughput Scheduler with Guaranteed Fairness for Wireless Networks and Other Applications," Ser. No. 11/427,476, filed Jun. 29, 2006 and entitled "Credit-Based Wireless Network Scheduling," Ser. No. 11/461,181, filed Jul. 31, 2006 and entitled "High-Throughput Scheduler with Integer-Based Eligible Number Initialization," and Ser. No. 11/468,917, filed Aug. 31, 2006 and entitled "Scheduling Methods and Apparatus Based on Adjusted Channel Capacity," all of which are commonly assigned herewith and incorporated by reference herein.

Despite the considerable advances provided by the scheduling techniques disclosed in the above-cited references, a need remains for further improvements. For example, many conventional network processors treat the output bandwidth as the only resource to be scheduled. Such an arrangement is appropriate in applications in which bandwidth is the primary resource bottleneck. However, the emergence of new applications such as residential gateways has led to increasing amounts of available bandwidth, via Gigabit Ethernet for example, while device processing power remains limited in such applications due to cost and size concerns. Thus, the network processor itself may in some cases become the primary resource bottleneck, resulting in underutilization of the output bandwidth.

This situation is of particular concern for traffic that is processor intensive, i.e., consumes large amounts of the processor resource. Processor intensive traffic typically involves small packet sizes, such as voice-over-IP (VoIP) traffic, and the header processing associated with such traffic can exacerbate the processor resource bottleneck. In fact, it is possible that a malicious user could attack a router or switch by generating large numbers of small-size packets having complex headers, thereby overwhelming the network processor and preventing legitimate users from accessing the output bandwidth.

Conventional approaches to dealing with allocation of two different resources fail to provide an adequate solution. These approaches generally attempt to allocate both resources fairly, or to combine the two resources and determine a single fair allocation. However, it is very difficult to achieve fairness in situations such as the processor resource bottleneck described above, where the processing power needed for a given packet is generally not known before the packet has been processed. Without that information, any fairness criteria defined for processor resource allocation will tend to be inaccurate.

Feedback control may also or alternatively be used in order to backpressure input traffic that consumes too much of a given resource. However, the input traffic from a Gigabit Ethernet port may contain thousands of flows, which makes it impractical to backpressure only some of the flows without affecting others.

Accordingly, it is apparent that a need exists for improved scheduling techniques which can avoid the problems associated with processor resource bottlenecks while also efficiently scheduling for the available output bandwidth.

SUMMARY OF THE INVENTION

The present invention in one or more illustrative embodiments provides multi-stage scheduling techniques that are able to schedule access to two or more resources, such as processor and output bandwidth resources. These techniques can, for example, prevent processor intensive traffic from overwhelming the processor and leading to underutilization of the output bandwidth resource.

In accordance with one aspect of the invention, incoming traffic received by a network processor or other processing device is separated into multiple traffic flows. Packets, cells or other data blocks of the traffic flows are scheduled for access to a processor resource using a first scheduling algorithm, and processed by the processor resource as scheduled by the first scheduling algorithm. The processor resource may comprise, for example, an available processing power of the processing device. The processed data blocks of the traffic flows are scheduled for access to a bandwidth resource using a second scheduling algorithm, and provided to the bandwidth resource as scheduled by the second scheduling algorithm. The bandwidth resource may comprise, for example, an available data transmission bandwidth of the processing device or an associated output port or network link.

In an illustrative embodiment, the incoming traffic is separated into the multiple traffic flows using a simple classification mechanism, for example, based on IP address or other identifying information associated with packets of the incoming traffic.

The first scheduling algorithm in an illustrative embodiment is a weighted DRR scheduling algorithm with adjustable weights based on queue length for the respective traffic flows. The traffic flows are enqueued in respective queues to await access to the processor resource. Each of the traffic flows may be assigned the same minimum weight as an initial weight for use by the weighted DRR scheduling algorithm. The weight assigned to a given one of the traffic flows is utilized to determine a corresponding quantum size for use by that traffic flow in the weighted DRR scheduling algorithm. The weighted DRR scheduling algorithm is configured such that if one of the traffic flows exhibits an increase in queue length, its corresponding weight is increased. The increase in weight may be determined by a specified linear function, or other type of function. The increase in weight may be subject to a maximum weight limitation applicable to each of the traffic flows.

The multi-stage scheduler in an illustrative embodiment may be implemented in a network processor integrated circuit or other processing device of a communication system, using a wide variety of different arrangements of scheduling circuitry.

DETAILED DESCRIPTION OF THE INVENTION

The invention will be illustrated herein in conjunction with exemplary network processors and communication systems. The exemplary network processors include multi-stage schedulers configured in a particular manner in order to illustrate the techniques of the invention. It should be understood, however, that the invention is more generally applicable to any processor and bandwidth resource scheduling application in which it is desirable to prevent a processor resource bottleneck from causing underutilization of a bandwidth resource. By way of example, the techniques described in conjunction with network processors in the illustrative embodiments can also be adapted for use in scheduling in other types of processors, or more generally other types of processing devices.

Figure 1:
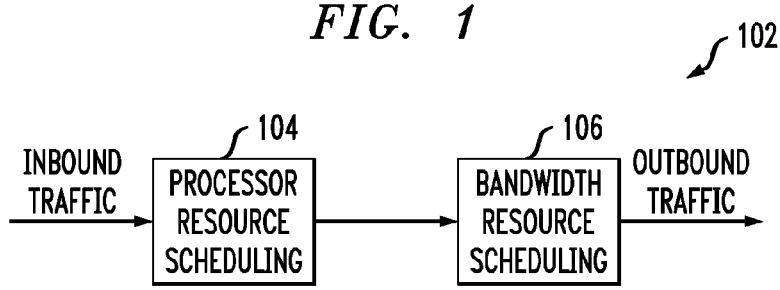
FIG. 1 is a simplified block diagram of a network processor with multi-stage scheduling in an illustrative embodiment of the present invention.

FIG. 1 shows a simplified diagram of a network processor 102 in accordance with an illustrative embodiment of the invention. The network processor in this embodiment includes a multi-stage scheduler comprising a processor resource scheduling element 104 and a bandwidth resource scheduling element 106.

Inbound traffic received in the network processor is first subject to processor resource scheduling in element 104. The processor resource subject to scheduling in element 104 may include any type of network processor operation(s) that may lead to a processor resource bottleneck, such as header processing or other known traffic processing operations, in any combination. The processor resource may thus comprise an amount of processing power of the network processor that is available for performing certain operations, or may be a general or overall processing power as expressed in, for example, processing cycles or other measures. The processed traffic is subject to bandwidth resource scheduling in element 106, and in accordance with the bandwidth resource scheduling is output from the network processor as outbound traffic. The bandwidth resource may comprise, for example, an available data transmission bandwidth of the processing device or an associated output port or network link.

The network processor 102 thus implements a dual resource scheduling model wherein both the processor resource and the bandwidth resource are scheduled by specified scheduling algorithms. These scheduling algorithms may be DRR, weighted DRR or other types of scheduling algorithms, as will be described in greater detail below.

The multi-stage scheduler comprising elements 104 and 106 as shown in FIG. 1 may be implemented using conventional scheduling circuitry of a type known to those skilled in the art. Such a scheduler may incorporate additional or alternative scheduling elements as described, for example, in one or more of the above-cited U.S. patent applications. The scheduling circuitry may be, for example, special-purpose circuitry configured to provide specific scheduling operations, or general-purpose circuitry such as processor and memory circuitry which implement scheduling operations under software control, or combinations of such circuitry. Thus, scheduling circuitry may include various arrangements of hardware, software and firmware capable of implementing the scheduling techniques described herein. The scheduling circuitry may utilize any arrangement of logic gates, processing elements or other circuitry capable of providing scheduling functionality of the type described herein.

It is also to be appreciated that the network processor 102 as shown in FIG. 1 is greatly simplified to highlight its two-stage scheduling functionality. The network processor will also generally include other elements of a type found in a conventional network processor, such as processing elements, buffers or other memory circuitry, input and output interface circuitry, etc. Examples of possible network processor configurations will be described in conjunction with FIGS. 6 and 7.

Figure 2:
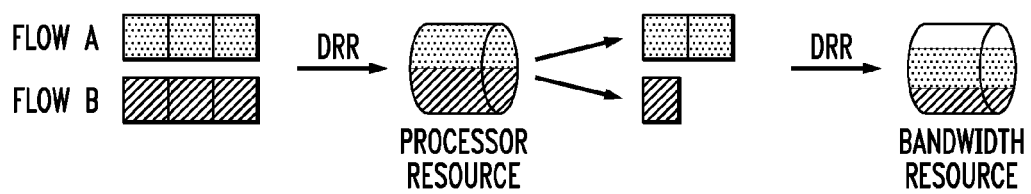
FIG. 2 shows an example of one possible multi-stage scheduling process that may be implemented in the network processor of FIG. 1.

Referring now to FIG. 2, an example illustrating the operation of two-stage scheduling in the network processor 102 is shown. In this example, it is assumed that the inbound traffic arriving at the network processor comprises two different traffic flows, denoted Flow A and Flow B in the figure. The various traffic flows may be associated with different users, applications or other entities. Each flow is comprised of a number of packets. The flows have different ratios of bandwidth resource requirements to processor resource requirements. More specifically, assume that Flow A has a normalized bandwidth-to-processor resource requirement ratio of 1:1, and that Flow B has a normalized bandwidth-to-processor resource requirement ratio of 1:3. Thus, Flow B represents a type of processor intensive traffic.

In conventional practice, the different flows would typically be mixed together and served by the processor resource using a first-in-first-out (FIFO) rule. After being served by the processor resource, a DRR scheduling algorithm might then be utilized to allocate the bandwidth resource among the packets of the processed flows. As described previously, the problem with such an arrangement is that the processor intensive traffic, in this example the Flow B traffic, would consume an excessive amount of the processor resource, and would tend to block the access of Flow A to the bandwidth resource, leading to underutilization of the bandwidth resource.

This problem is overcome in the illustrative embodiments herein by first separating the inbound traffic into flows, and then scheduling access of the flows to the processor resource using a specified scheduling algorithm. With reference to the FIG. 2 example, the inbound traffic is separated into Flow A and Flow B, and access of these flows to the processor resource is scheduled using, for example, a DRR scheduling algorithm. This allows the processor resource to be fairly allocated between the two flows. Since the Flow A traffic uses less of the processor resource, more Flow A packets will be able to pass through the processor than in the conventional arrangement described previously. The resulting processed packets are then scheduled for access to the bandwidth resource, again using a specified scheduling algorithm such as DRR.

Such an arrangement advantageously ensures that the processor intensive Flow B traffic in this example will not consume excessive amounts of the processor resource and thereby unduly limit access of Flow A traffic to the bandwidth resource. This leads to improved utilization of the bandwidth resource in the presence of processor intensive traffic.

Figure 3:
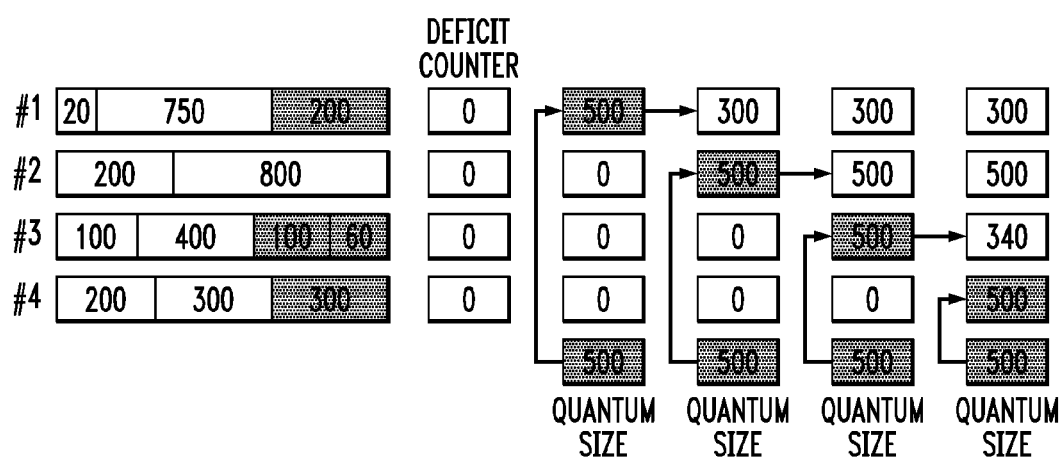
FIG. 3 illustrates the operation of DRR scheduling used within a given stage in the scheduling process example of FIG. 2.

In the FIG. 2 example, it is assumed for simplicity and clarity of illustration that otherwise conventional DRR scheduling is used for both the processor resource scheduling and for the bandwidth resource scheduling, as performed in respective elements 104 and 106 of network processor 102. An illustration of such DRR scheduling for four separate flows using a quantum size of 500 units is shown in FIG. 3. The units may represent, for example, packet size in bytes or bits. However, it should be noted that DRR scheduling is not a requirement of the invention. Other embodiments can use other types of scheduling algorithms. For example, in the embodiment to be described below in conjunction with FIGS. 4 and 5, the processor resource scheduling is implemented using a weighted DRR scheduling algorithm with adjustable weights based on queue length.

The FIG. 2 example allocates the processor resource fairly between the two flows, Flow A and Flow B, without attempting to determine the relative processor resource requirements of the two flows. As indicated previously herein, such information is generally not available in advance, prior to packet processing. However, further improvements in performance may be achievable by adjusting the flow classification and processor resource scheduling to take into account the relative processor resource requirements of these flows. For example, it is possible for the network processor to collect statistical information on the processing power needed by different types of traffic, and to utilize such information in the flow classification and processor resource scheduling operations. Such an approach, however, may itself consume an undue amount of the processor resource.

Figure 4:
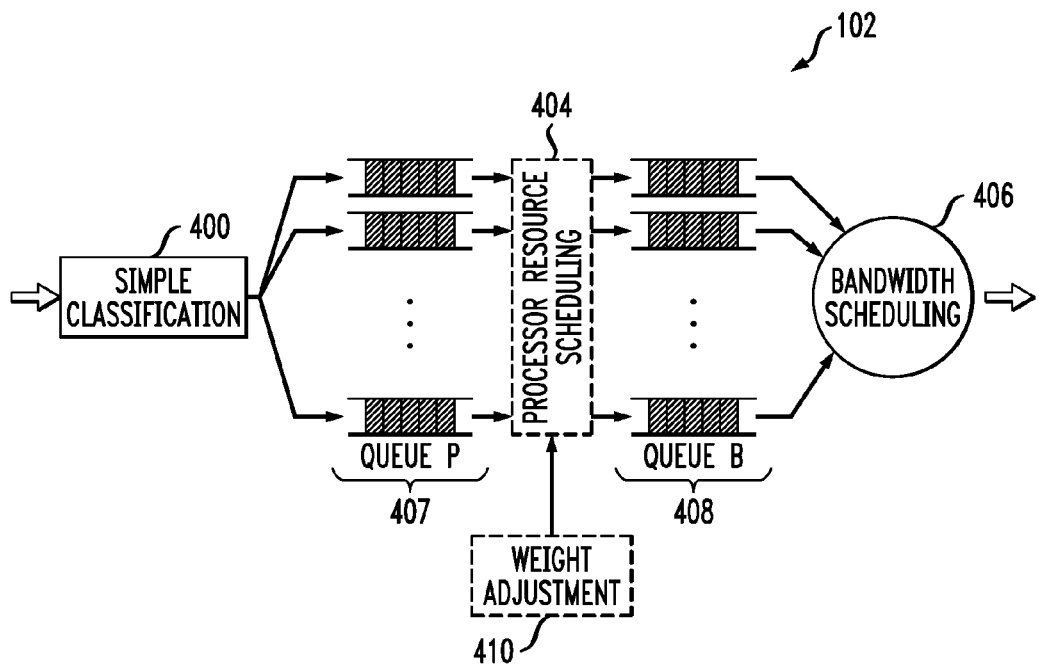
FIG. 4 is a more detailed view of the FIG. 1 network processor with multi-stage scheduling.

The illustrative embodiment of FIG. 4 addresses this issue by using a simple classification operation to separate the inbound traffic into different flows, followed by scheduling in the processor resource scheduling element using weighted DRR scheduling with adaptive adjustment of variable weights based on queue lengths.

Referring now more specifically to FIG. 4, the network processor 102 as shown in this embodiment comprises a classification element 400, which receives the inbound traffic, a processor resource scheduling element 404, and a bandwidth resource scheduling element 406. The latter elements correspond generally to respective scheduling elements 104 and 106 of FIG. 1. Also shown in FIG. 4 are packet queues 407, the lowermost of which is also denoted Queue P, and packet queues 408, the lowermost of which is also denoted Queue B. The network processor further includes a weight adjustment element 410 coupled to the processor resource scheduling element 404. Although shown as separate elements in this embodiment, the packet queues 407 and weight adjustment element 410 may alternatively be incorporated into processor resource scheduling element 404. Similarly, the packet queues 408 may be part of the bandwidth resource scheduling element 406. Numerous other alternative configurations are also contemplated.

The classification element 400 classifies the inbound traffic into separate flows that are enqueued in corresponding ones of the packet queues 407. In this embodiment, the classification is a simple classification that is based on a specified condition such as, for example, the Internet protocol (IP) addresses, virtual local area network (VLAN) tags or other identifying information of the arriving packets. Such an arrangement requires only very simple processing that does not itself consume significant processor resources. After processing in accordance with the schedule established by the processor resource scheduling element 404, the processed packets for the separate flows are enqueued in corresponding ones of the packet queues 408 to await scheduling by the bandwidth resource scheduling element 406. In the present embodiment, the bandwidth resource scheduling element utilizes a conventional DRR scheduling algorithm, although as indicated previously other scheduling algorithms may be used. The DRR scheduling generally works well in most situations in which the inbound traffic does not consume all of the processor resources, and so is considered an appropriate bandwidth resource scheduling algorithm for this embodiment.

Figure 5:
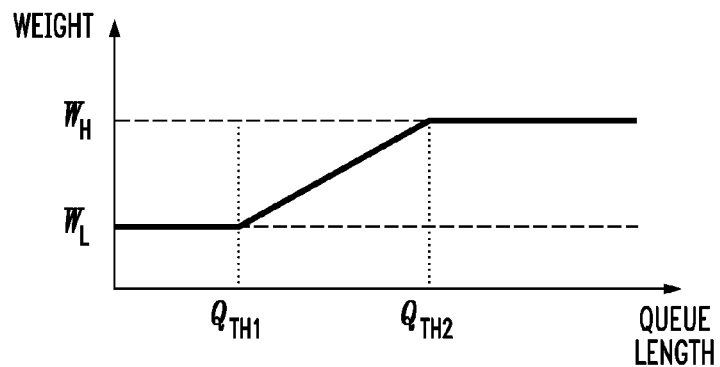
FIG. 5 is a graph of processor resource scheduling weights as a function of queue length for use in a weight adjustment element of the network processor as shown in FIG. 4.

The operation of the weighted DRR scheduling implemented by processor resource scheduling element 404 in conjunction with weight adjustment element 410 will now be described with reference to the graph of FIG. 5. The graph shows processor resource scheduling weight as a function of queue length for use in determining weight adjustments for the weighted DRR scheduling in element 404. This determination, based on stored information characterizing the graph, is implemented by weight adjustment element 410 in the present embodiment. The parameters $W_L$ and $W_H$ designate the respective lower and upper bounds of the weight as a function of queue length for a given one of the packet queues 407. The lower and upper bounds are associated with respective queue length thresholds $Q_{TH1}$ and $Q_{TH2}$ as shown.

The weights in this embodiment are used as quantum sizes for DRR scheduling of the respective flows. Initially, each of the flows is assigned a weight of $W_L$, that is, all flows will initially have the same quantum size. An increase in the length of a given one of the packet queues 407, for example, Queue P, could indicate that an insufficient portion of the processor resource is allocated to the corresponding flow. Accordingly, as Queue P increases in length, the weight assigned to the corresponding flow is increased, such that a larger quantum size is used for that flow in the weighted DRR scheduling process.

The upper bound of weight $W_H$ protects the processor resource from being used up by a single flow. The extent of this protection is determined by the value of $W_H$, while the degree of flexibility in allocating the processor resource among the separate flows is determined by the difference $W_H-W_L$. However, the particular shape and other characteristics of the FIG. 5 graph are merely exemplary, and other embodiments may use, for example, one or more additional intermediate thresholds with linear functions of differing slope between each pair of thresholds, various non-linear types of functions, etc. Also, the manner in which the weights are incorporated into the scheduling algorithm may be altered in other embodiments.

It should be noted that, in the FIG. 4 embodiment, the processor resource requirements of the various flows are still unknown before packet processing. The embodiment may be modified in a straightforward manner to allow the processor resource scheduling element 404 to alter the quantum sizes or other aspects of the weighted DRR scheduling based on, for example, estimates of the actual amounts of the processor resource consumed by the respective flows. Any of a number of well-known techniques may be used to obtain such estimates, as will be appreciated by those skilled in the art.

The multi-stage scheduler of network processor 102 may be timeslot based. For example, it may schedule packets or other data blocks for processing or transmission in timeslots. However, the use of such timeslot based scheduling is not required in implementing the invention.

The multi-stage scheduler may be implemented at least in part in the form of an integrated circuit, as will be described in greater detail elsewhere herein. Such an integrated circuit may comprise a network processor such as network processor 102 or other type of processor or processing device that is implemented in a given network node or other communication system element.

Figure 6:
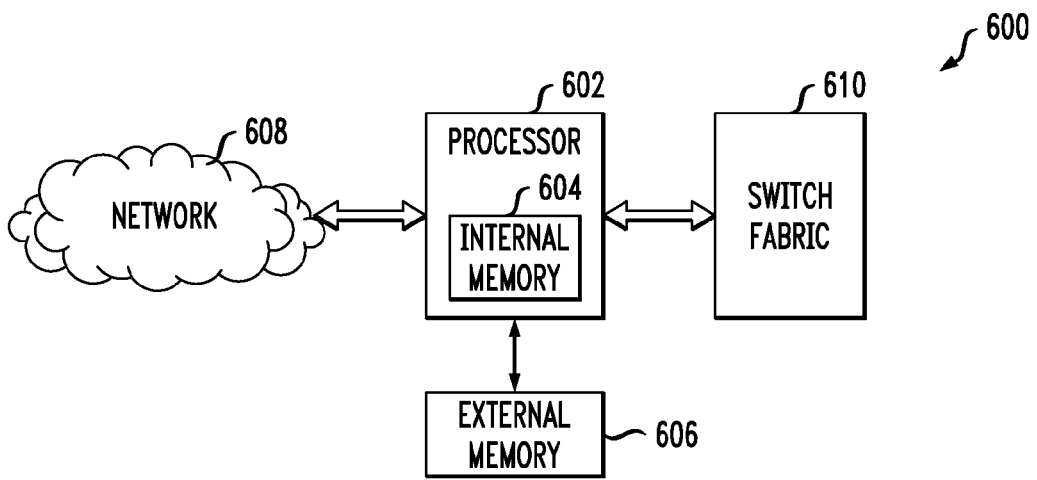
FIG. 6 shows an example of a communication system which incorporates a network processor such as that shown in FIGS. 1 and 4.

Exemplary communication system applications of network processor 102 will now be described with reference to FIGS. 6 and 7. In these figures, it is again assumed without limitation that a multi-stage scheduler of the type described above is implemented within a network processor. A communication system 600 as shown in FIG. 6 includes a network processor 602 having an internal memory 604. The network processor 602 is coupled to an external memory 606 as shown, and is configured to provide an interface for communicating packets, cells or other arrangements of data between a network 608 and a switch fabric 610. All such arrangements of data are intended to be encompassed by the general term "data block" as used herein.

The network 608 may be, for example, a wireless network, while the network processor 602 and switch fabric 610 may be implemented in base stations, network controllers or other elements of such systems. More specifically, the network may comprise a portion of an otherwise conventional Universal Mobile Telecommunications System (UMTS) or Wideband Code Division Multiple Access (WCDMA) wireless cellular communication system. As another example, the network 608 may comprise an IP network.

The network processor 602 and its associated external memory 606 may be implemented, again by way of example, as one or more integrated circuits installed on a line card or port card of a router, switch or other system element.

Figure 7:
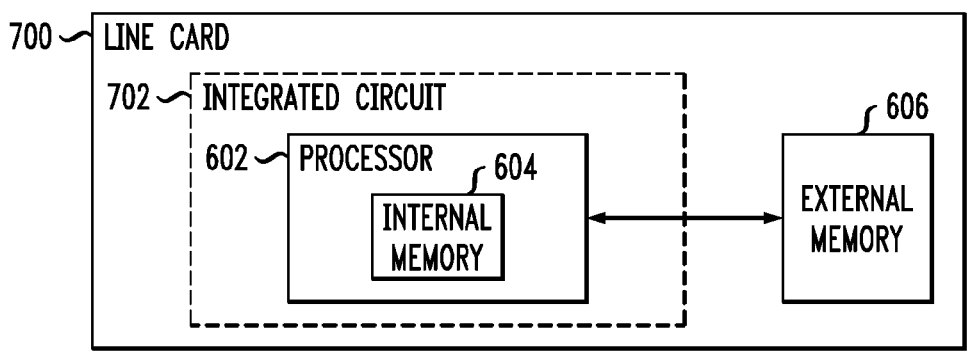
FIG. 7 is a block diagram of a network processor of the FIG. 6 system shown as an integrated circuit installed on a line card of a router or switch.

FIG. 7 illustrates an example line card embodiment of a portion of the system 600 of FIG. 6. In this embodiment, the system comprises a line card 700 having at least one integrated circuit 702 installed thereon. The integrated circuit 702 comprises network processor 602 which has internal memory 604. The network processor 602 interacts with external memory 606 on the line card 700. The external memory 606 may serve, e.g., as an external static random access memory (SRAM) or dynamic random access memory (DRAM) for the network processor integrated circuit 702. Such memories may be configured in a conventional manner. A suitable host processor may also be installed on the line card 700, and used for programming and otherwise controlling the operation of one or more network processor integrated circuits on the line card 700.

The portion of the communication system as shown in FIGS. 6 and 7 is considerably simplified for clarity of illustration. It is to be appreciated, however, that the system may comprise a router, switch or other element which includes multiple line cards such as that shown in FIG. 7, and that each of the line cards may include multiple integrated circuits. A similar embodiment may be implemented in the form of a port card. However, the invention does not require such card-based implementation in a router, switch or other element.

It should also be understood that the particular arrangements of elements shown in FIGS. 6 and 7 are by way of illustrative example only. More specifically, as previously noted, the invention can be implemented in any type of processor or other communication system processing device, and is not limited to any particular network-based processing application.

A "processor" as the term is used herein may be implemented, by way of example and without limitation, utilizing elements such as those commonly associated with a microprocessor, central processing unit (CPU), digital signal processor (DSP), application-specific integrated circuit (ASIC), or other type of data processing device, as well as portions and combinations of such elements.

Also, the system 600 and network processor 602 as illustrated in FIGS. 6 and 7 may include other elements in addition to or in place of those specifically shown, including one or more elements of a type commonly found in a conventional implementation of such a system and network processor. For example, the network processor may include a classifier, queuing and dispatch logic, one or more memory controllers, and interface circuitry for interfacing the network processor with the network 608, the switch fabric 610, a host processor or other external device(s), as well as other conventional elements not explicitly shown in the figure. These and other conventional elements, being well understood by those skilled in the art, are not described in detail herein.

As mentioned previously, the scheduling functionality of a network processor as described herein may be implemented at least in part in the form of software program code. For example, elements associated with the performance of scheduling operations in the network processor may be implemented at least in part utilizing elements that are programmable via instructions or other software that may be supplied to the network processor via an external host processor or other suitable mechanism. More specifically, information characterizing particular scheduling algorithms, or associated traffic shaping information, may be supplied to the network processor from the associated host processor or other suitable mechanism.

Although the illustrative embodiments are described in the context of DRR and weighted DRR scheduling, other types of scheduling algorithms may be utilized in implementing the invention. These include, by way of example, Weighted Fair Queuing (WFQ), Worst-case Fair Weighted Fair Queuing (WF$^2$Q), maximum carrier-to-interference ratio (Max C/I), Proportional Fairness (PF) and Modified Largest Weighted Delay First (M-LWDF).

As indicated above, a given embodiment of the present invention can be implemented as one or more integrated circuits. In such an arrangement, a plurality of identical die is typically formed in a repeated pattern on a surface of a wafer. Each die may include a device as described herein, and may include other structures or circuits. The individual die are cut or diced from the wafer, then packaged as an integrated circuit. One skilled in the art would know how to dice wafers and package die to produce integrated circuits. Integrated circuits so manufactured are considered part of this invention.

Again, it should be emphasized that the above-described embodiments of the invention are intended to be illustrative only. For example, although the illustrative embodiments disclosed herein implement two-stage scheduling, other embodiments may include more than two stages of scheduling. Such an arrangement may involve two or more processor resource scheduling stages for respective processor resources, or two or more bandwidth resource scheduling stages for respective bandwidth resources. A wide variety of different types of processor resources and bandwidth resources can be scheduled using the techniques of the invention. Other embodiments can use different types and arrangements of processing elements for implementing the described functionality. These and numerous other alternative embodiments within the scope of the following claims will be apparent to those skilled in the art.

What is claimed is:

1. A scheduling method for controlling access to processor and bandwidth resources in a processing device, the method comprising the steps of:
separating incoming traffic into multiple traffic flows;
scheduling data blocks of the traffic flows for access to the processor resource using a first scheduling algorithm;
processing the data blocks of the traffic flows by the processor resource as scheduled by the first scheduling algorithm;
scheduling the processed data blocks of the traffic flows for access to the bandwidth resource using a second scheduling algorithm;
providing the processed data blocks to the bandwidth resource as scheduled by the second scheduling algorithm;
wherein said steps are performed by the processing device;
the processing device comprising a multi-stage scheduler having a serial arrangement of first and second scheduler stages for implementing the respective steps of scheduling for access to the processor resource using the first scheduling algorithm and scheduling for access to the bandwidth resource using the second scheduling algorithm;
the first scheduler stage being operative to ensure that particular ones of the data blocks requiring a relatively high level of the processor resource do not prevent other ones of the data blocks requiring a relatively low level of the processor resource from accessing the bandwidth resource.

2. The method of claim 1 wherein the processing device comprises a network processor.

3. The method of claim 1 wherein the processor resource comprises an available processing power of the processing device.

4. The method of claim 1 wherein the bandwidth resource comprises an available data transmission bandwidth of the processing device.

5. The method of claim 1 wherein the separating step further comprises separating the incoming traffic into the multiple traffic flows in accordance with identifying information associated with packets of the incoming traffic.

6. The method of claim 5 wherein the identifying information comprises an Internet protocol address.

7. The method of claim 5 wherein the identifying information comprises a virtual local area network tag.

8. The method of claim 1 wherein at least one of the first and second scheduling algorithms comprises a deficit round-robin scheduling algorithm.

9. The method of claim 8 wherein the first scheduling algorithm comprises a weighted deficit round-robin scheduling algorithm having adjustable weights based on queue length for the respective traffic flows.

10. The method of claim 9 wherein the traffic flows are enqueued in respective ones of a plurality of queues to await access to the processor resource.

11. The method of claim 9 wherein each of the traffic flows is assigned the same minimum weight as an initial weight for use by the weighted deficit round-robin scheduling algorithm.

12. The method of claim 11 wherein the weight assigned to a given one of the traffic flows is utilized to determine a corresponding quantum size for use by that traffic flow in the weighted deficit round-robin scheduling algorithm.

13. The method of claim 9 wherein the weighted deficit round-robin scheduling algorithm is configured such that if one of the traffic flows exhibits an increase in queue length, its corresponding weight is increased.

14. The method of claim 13 wherein the increase in weight is determined by a specified linear function.

15. The method of claim 13 wherein the increase in weight is subject to a maximum weight limitation applicable to each of the traffic flows.

16. The method of claim 8 wherein the second scheduling algorithm comprises an unweighted deficit round-robin scheduling algorithm.

17. An apparatus, the apparatus comprising:
a processing device comprising scheduling circuitry;
the scheduling circuitry implementing a processor resource scheduling element and a bandwidth resource scheduling element;
wherein the processor resource scheduling element schedules data blocks of multiple traffic flows for access to a processor resource using a first scheduling algorithm, the data blocks of the traffic flows being processed by the processor resource as scheduled by the first scheduling algorithm;

wherein the bandwidth resource scheduling element schedules processed data blocks of the traffic flows for access to a bandwidth resource using a second scheduling algorithm, the processed data blocks being provided to the bandwidth resource as scheduled by the second scheduling algorithm; and wherein the scheduling circuitry comprises a multi-stage scheduler having a serial arrangement of first and second scheduler stages for implementing the respective processor resource scheduling element and bandwidth resource scheduling element;

the first scheduler stage being operative to ensure that particular ones of the data blocks requiring a relatively high level of the processor resource do not prevent other ones of the data blocks requiring a relatively low level of the processor resource from accessing the bandwidth resource.

18. The apparatus of claim 17 wherein at least one of the first and second scheduling algorithms comprises a deficit round-robin scheduling algorithm.

19. The apparatus of claim 18 wherein the first scheduling algorithm comprises a weighted deficit round-robin scheduling algorithm having adjustable weights based on queue length for the respective traffic flows.

20. The apparatus of claim 17 wherein the processing device comprises a network processor.

21. The apparatus of claim 17 wherein the processing device is implemented in the form of an integrated circuit.

22. A communication system comprising:
a network;
a switch fabric; and
a processing device coupled between the network and the switch fabric;
wherein the processing device is operative to schedule data blocks of multiple traffic flows for access to a processor resource using a first scheduling algorithm, the data blocks of the traffic flows being processed by the processor resource as scheduled by the first scheduling algorithm; and
wherein the processing device is further operative to schedule processed data blocks of the traffic flows for access to a bandwidth resource using a second scheduling algorithm, the processed data blocks being provided to the bandwidth resource as scheduled by the second scheduling algorithm;
the processing device comprising a multi-stage scheduler having a serial arrangement of first and second scheduler stages for implementing the respective scheduling for access to the processor resource using the first scheduling algorithm and scheduling for access to the bandwidth resource using the second scheduling algorithm;
the first scheduler stage being operative to ensure that particular ones of the data blocks requiring a relatively high level of the processor resource do not prevent other ones of the data blocks requiring a relatively low level of the processor resource from accessing the bandwidth resource.

* * * * *